No. 840,274. PATENTED JAN. 1, 1907.
F. H. WEAVER.
SEED PLANTER AND FERTILIZER DISTRIBUTER.
APPLICATION FILED APR. 12, 1906.
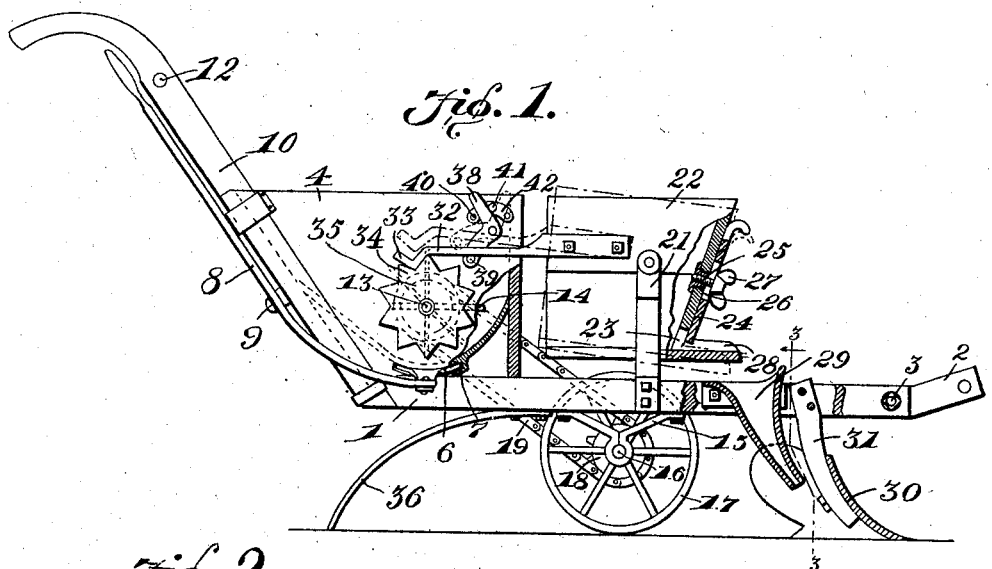
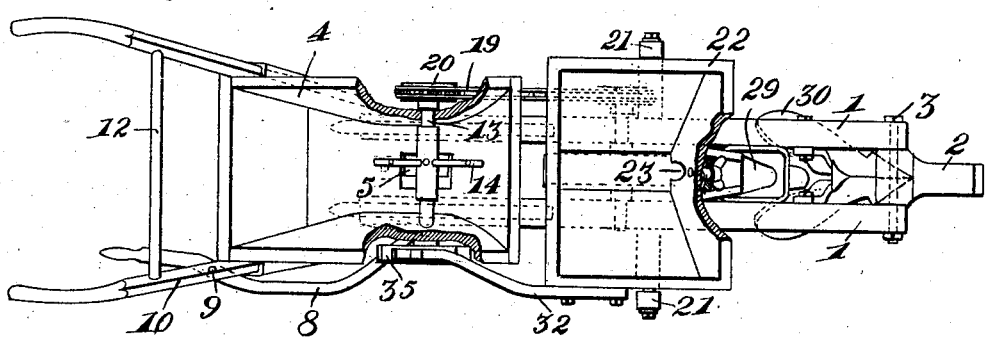
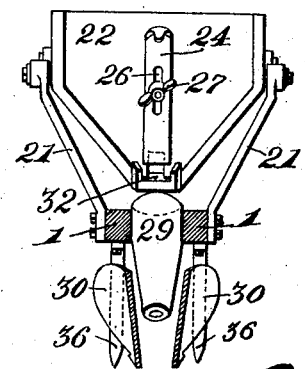
WITNESSES:
Flem H. Weaver,
INVENTOR.
By C. A. Snow & Co.
ATTORNEYS

UNITED STATES PATENT OFFICE.

FLEM H. WEAVER, OF GRIFFIN, GEORGIA, ASSIGNOR OF ONE-THIRD TO ERNEST E. WOLCOTT, ONE-THIRD TO HENRY H. GEIGER, AND ONE-THIRD TO THOMAS J. BROOKS, OF GRIFFIN, GEORGIA.

SEED-PLANTER AND FERTILIZER-DISTRIBUTER.

No. 840,274.     Specification of Letters Patent.     Patented Jan. 1, 1907.

Application filed April 12, 1906. Serial No. 311,304.

*To all whom it may concern:*

Be it known that I, FLEM H. WEAVER, a citizen of the United States, residing at Griffin, in the county of Spalding and State of Georgia, have invented a new and useful Seed-Planter and Fertilizer-Distributer, of which the following is a specification.

This invention relates to machines for planting seed and distributing fertilizing material at a single operation; and it has for its objects to simplify and improve the construction and operation of this class of machines.

With these and other ends in view, which will readily appear as the nature of the invention is better understood, the same consists in the improved construction and novel arrangement and combination of parts, which will be hereinafter fully described, and particularly pointed out in the claims.

In the accompanying drawings has been illustrated a simple and preferred form of the invention, it being, however, understood that no limitation is necessarily made to the precise structural details therein exhibited, but that changes, alterations, and modifications within the scope of the invention may be made when desired.

In the drawings, Figure 1 is a side elevation, partly in section, of a combined seed-planter and fertilizer-distributer constructed in accordance with the principles of the invention. Fig. 2 is a top plan view with parts broken away. Fig. 3 is a transverse sectional view taken on the plane indicated by the line 3 3 in Fig. 1.

Corresponding parts in the several figures are indicated throughout by similar characters of reference.

The frame of the improved machine includes the parallel side beams 1 1, which are spaced apart at their front ends by a block or stub-tongue 2, serving for the attachment of the draft, said block or stub-tongue being secured between the front ends of the side beams, as by means of a bolt 3, the rear ends of the side beams being spaced and connected in any suitable manner. The frame supports, near its rear end, the seed-hopper 4, the bottom of which is provided with a slot 5 for the escape of the seed, the area of the slot or opening being governed by a slide 6, supported adjustably in cleats 7 upon the under side of the bottom of the hopper, said slide being operable by a lever 8, which has been shown as being fulcrumed at 9 upon one of the handles 10, which are bolted upon or otherwise secured to the side beams of the frame, said handles being connected with each other by a rung 12. The sides of the seed box or hopper have bearings for a transverse shaft 13, carrying radial fingers or agitators 14 for the purpose of loosening the contents of the hopper and assisting in expelling the same through the slot or aperture 5, motion being transmitted to the agitator-shaft from the carrying-wheel of the machine, as will be presently described.

The side beams 1 1 are provided on their under sides with brackets 15, having bearings for a shaft 16, upon which the carrying-wheel 17 is mounted. The shaft 16 has a sprocket-wheel 18, connected by a link belt 19 with a sprocket-wheel 20 upon the agitator-shaft, to which motion will thus be transmitted.

Upon the side beams 1 1 in front of the seed box or hopper 4 there are secured upward-extending brackets 21, between which a fertilizer box or hopper 22 is supported for oscillation. Said box is provided in its front wall with an aperture 23, the area of which may be governed by a slide 24, secured upon the front wall by means of a bolt 25, extending through a slot 26 in said slide, and having a wing-nut 27, whereby said slide may be secured at any desired adjustment. The box or hopper 22 has a forwardly-extending spout or chute 28, over which the fertilizing material escaping through the aperture 23 is conducted to a tubular spout 29, through which it is discharged upon the ground directly in rear of the furrow-opener 30, which is supported upon an ordinary bifurcated standard 31 at the front end of the frame.

Upon one side of the oscillatory box 22 there is secured a rearward-extending arm 32, constructed, preferably, of resilient material and terminating at its rear end in a V-shaped lug 33, adapted to ride upon and to be engaged by the correspondingly-shaped teeth 34 of a star-shaped gear-wheel 35, mounted upon the agitator-shaft 13. It will be seen that when the latter is rotated there will be communicated to the fertilizer box or hopper an oscillatory or vibratory motion, which results in gradually expelling the contents of said box through the aperture 23, the escaping fertilizing material being conveyed through the tubular spout 29 to the furrow, the escape of the fertilizing material being regulated by the slide 24. At the same time the contents of the seedbox will be gradually expelled through the slot 5, the area of which is regulated by the slide 6.

It will be observed that the carrying-wheel travels in the furrow in rear of the fertilizer-spout, so that the fertilizing material will be pressed compactly into the furrow before it can be blown away by the wind; but the carrying-wheel is in front of the seed-hopper, so that the seed dropping into the furrow will not be crushed thereby or pressed into the ground in such a manner as to prevent it from sprouting. For the purpose of covering the seed a coverer 36 of ordinary construction is provided.

Upon the side of the seed box or hopper 4 there is pivoted a bell-crank lever 38, having a lug 39 that extends beneath the arm 32 of the fertilizer-box, so that by rocking said lever to the position shown in dotted lines in Fig. 1 the arm 32 may be supported in a position where it will not be engaged by the star-wheel 35. The lever 38 may be secured at various adjustments, as by means of a pin or plug 40 engaging any one of a plurality of apertures 41 in a segment-plate 42 or by other suitable means.

From the foregoing description, taken in connection with the drawings hereto annexed, the operation and advantages of this invention will be readily understood. The construction of the improved machine is simple and compact and of such a nature that it is not liable to get out of order, while in operation the machine has proven to be thoroughly efficient for the purposes for which it is intended. While specially designed and intended to be used as a cotton-planter, it will be readily understood that it may be successfully used for drilling seeds and grain of various kinds.

Having thus described the invention, what is claimed is—

1. In a machine of the class described, a seedbox having a driven agitator-shaft provided with a star-wheel, an oscillatory fertilizer-box having an arm provided with a terminal V-shaped lug engaging the star-wheel, a bell-crank fulcrumed upon the seed-box and having a lug extending beneath and adapted to support the arm that extends from the fertilizer-box, and means for securing the bell-crank at various adjustments.

2. A machine of the class described consisting of a wheel-supported frame, a seed-hopper relatively fixed upon said frame, a seed-stirring mechanism carried by said seed-hopper, an oscillating hopper attached to the frame and being operatively connected with said seed-stirring mechanism, means carried by the fixed hopper and adapted to limit the movement of the oscillating hopper, and means operatively connecting said seed-stirring mechanism with the supporting-wheel.

3. In a machine of the class described, a wheel-supported frame, a hopper relatively fixed upon said frame, a seed-stirrer carried by said fixed hopper, a star-wheel attached to the shaft of said seed-stirrer, a means for rotating said shaft, and being operatively connected with the frame-supporting wheel, an oscillating hopper attached to the frame, an arm attached to said oscillating hopper and having a V-shaped end which engages the periphery of said star-wheel, the apex of said V-shaped end being disposed toward the center of said star-wheel.

In testimony that I claim the foregoing as my own I have hereto affixed my signature in the presence of two witnesses.

FLEM H. WEAVER.

Witnesses:
A. C. SORREL,
JOSEPH D. BOYD.